United States Patent [19]

Edbauer

[11] Patent Number: 5,208,836
[45] Date of Patent: May 4, 1993

[54] METHOD FOR BIT DETECTION AT THE RECEIVER END OF DIFFERENTIALLY CODED BINARY OR QUATERNARY PSK SIGNALS IN DIFFERENTIAL-COHERENT DEMODULATION

[75] Inventor: Franz Edbauer, Germering, Fed. Rep. of Germany

[73] Assignee: Deutsche Forschungsanstalt fur Luft-und Raumfahrt e.v., Cologne, Fed. Rep. of Germany

[21] Appl. No.: 740,688

[22] Filed: Aug. 6, 1991

Related U.S. Application Data

[63] Continuation-in-part of Ser. No. 604,286, Oct. 29, 1990, abandoned.

[30] Foreign Application Priority Data

Oct. 27, 1989 [DE] Fed. Rep. of Germany ... P3935911.5

[51] Int. Cl.$^5$ .............................................. H04L 27/22
[52] U.S. Cl. ..................................... 375/85; 329/304
[58] Field of Search ................... 375/77, 80, 82, 83, 375/84, 85, 86, 97; 329/304, 306, 307, 309, 310

[56] References Cited

U.S. PATENT DOCUMENTS 3,794,921  2/1974  Unkauf ................................... 375/84
4,603,393  7/1986  Laurent et al. ...................... 329/306
4,608,540  8/1986  Tsuchiya et al. .................... 329/306
4,715,047  12/1987  Hambley .............................. 329/310
4,879,728  11/1989  Tarallo ................................... 375/84

OTHER PUBLICATIONS

*IEEE Transactions on Information Theory*, vol. 34, No. 6, Nov. 1988, pp. 1491-1500.

*Primary Examiner*—Stephen Chin
*Attorney, Agent, or Firm*—Browdy and Neimark

[57] ABSTRACT

In a method for bit detection at the receiver end of differentially coded binary or quaternary PSK signals in differential-coherent demodulation, first received, processed signals ($Y_n$) are supplied parallel to L symbol detectors (S1 to SL) of the order j (j=1,2,3, ..., L; (L>1)). Then the conjugate complex signals ($Y^*_{n-1}$, $Y^*_{n-2}$, ... $Y^*_{n-L}$), which are delayed by j symbol periods, and the unchanged, processed input signals ($Y_n$) are multiplied in multiplication elements (M) to non-quantized output values $z_n^{(j)}$ of the L symbol detectors and are subsequently complex conjugated. Thereafter, already detected, regenerated PSK symbols ($â_{n-1}$, $â_{n-2}$, ... $â_{n-L+1}$), delayed by time delay elements (T), are correspondingly fed back, and from this a symbol ($a_n$) is determined, for which the sum of the squared distances $|z_n^{(j)} - \epsilon a_n â_{n-1} â_{n-2} \ldots â_{n-j+1}|^2$ with j=2,3, ... L) of the L symbol detectors assumes a minimum.

1 Claim, 4 Drawing Sheets

METHOD FOR BIT DETECTION AT THE RECEIVER END OF DIFFERENTIALLY CODED BINARY OR QUATERNARY PSK SIGNALS IN DIFFERENTIAL-COHERENT DEMODULATION

This application is a continuation-in-part of 07/604,286 filed Oct. 29, 1990, now abandoned.

BACKGROUND OF THE INVENTION

1. Field of the Invention

The invention relates to a method for bit detection at the receiver end of differentially coded binary or quaternary PSK (PSK =phase shift keying) signals in differential-coherent demodulation. In this connection, differential-coherent demodulation is understood to mean that, instead of using a derived reference carrier for phase demodulation, the phase of the previously received signal is used as phase reference. This has the advantage that no PLL (phase-locked loop) is required for the carrier, so that the often difficult acquisition and phase control of the carrier are unnecessary.

2. Prior Art

In methods used up to now for bit detection in DPSK modulation a transmitter generates, for example at the time $t=nT$, where n is an integer and T is the symbol period, the complex valued signal $$a_n = \exp(j\phi_i), \quad (1)$$

where $$\phi_i = i2\pi/M, \quad i=0,1,\ldots,M-1 \quad (2)$$

mean the M equidistant phase values of the M-PSK signal in the complex signal plane (see FIG. 1).

SUMMARY OF THE INVENTION

In what follows, only quaternary (M=4) and binary (M=2) signals are being considered. In quaternary phase shift keying (4-DPSK), the assignment of the bit pairs to be transmitted is made by means of Gray coding (see FIG. 1). Differential coding means that the phase of the symbol $a_n$ at time n is added to the phase of a symbol $c_{n-1}$ transmitted at time $(n-1)$, so that the result is $$c_n = c_{n-1} a_n \quad (3)$$

The transmitted signal then is:

$$s_n(t) = Re\{\sqrt{2S} \, c_n \exp(j2\pi f_c t)\}, \quad (4)$$

where S is the signal power and $f_c$ the carrier frequency.
The receiver input signal then is $$r(t) = s_n(t) + n(t), \quad (5)$$

where $n(t)$ is white Gaussian noise with one-sided noise power density $N_o$.
The bit energy to noise power density ratio is $$E_b/N_o = ST/[N_o ld(M)], \quad (6)$$

where ld is the logarithm to base 2.

Bit detection is suitably described in the complex base band. Generation of the time-discrete base band signal $$y_n = R_n + jI_n \quad (7)$$

takes place in accordance with FIG. 2 by mixing the received signal with reference signals $$v_c(t) = \cos(\pi k t/T - \psi_o) \quad (8)$$

$$v_s(t) = \sin(\pi k t/T - \psi_o) \quad (9)$$

and by subsequent integration over a symbol period. The reference signals $v_c(t)$ and $v_s(t)$ are generated by an AFC (automatic frequency control) unit, where k is an integer ($f_c = k/2T$) and $\psi_o$ is an arbitrary but constant phase shift. It is now assumed that the frequency of the reference signals exactly matches the input frequency. The result for real and imaginary part of $y_n$ then is:

$$R_n = \int_{(n-1)T}^{nT} v_c(t) r(t) dt \quad (10)$$

$$I_n = \int_{(n-1)T}^{nT} v_s(t) r(t) dt. \quad (11)$$

The integrator output values are converted analog-digitally, something not shown in detail in FIG. 2, and are further digitally processed in the receiver at a sampling rate of 1/T.

In a conventional DPSK receiver differential-coherent demodulation is performed with a first order symbol detector, which corresponds to an area above the dashed line in FIG. 3. In the symbol detector the conjugate complex received symbol $Y^*_{n-1}$, which is delayed by one symbol period, is multiplied by the momentary symbol $y_n$. Then the differential-coherently demodulated signal at the symbol detector output is:

$$z_n^{(1)} = Y_n Y_{n-1}^* = \epsilon a_n + n_n^{(1)}, \quad (12)$$

where the formation of the conjugate complex value is indicated by the symbol *, for which in FIG. 3 the block CONJG is used, $n_n^{(1)}$ is non-Gaussian noise and $\epsilon = ST^2/2$ is a constant which only depends on the signal power and the data rate.

In quaternary phase shift keying (4-DPSK), the detection $\hat{a}'_n$ of the transmitted signal $a_n$ (where the symbol ' indicates conventional detection) is accomplished by detecting that decision area into which the signal $z_n^{(1)}$ falls. The four decision areas are indicated by dashed lines in FIG. 1. Synonymous to that, one can determine that 4-DPSK symbol $a_n$ whose distance with respect to $z_n^{(1)}$ is smallest, so that $$a'_n = \min_{a} |z_n^{(1)} - \epsilon a_n|^2. \quad (13)$$

is valid. In place of the Equation (13) it is also possible to use the following decision rule:

$$a'_n = \max_{a} \{Re[a_n z_n^{(1)*}]\}. \quad (14)$$

The received regenerated bit pair results from the assignment to $\hat{a}'_n$ in accordance with FIG. 1.
The theoretical bit error probability for 4-DPSK is given by:

$$P_b^{(4)} = Q(a,b) - \tfrac{1}{2}I_0(ab)\exp[-\tfrac{1}{2}(a^2+b^2)], \tag{15}$$

where Q(a,b) is the Q function and $I_o$ the modified Bessel function of zero order a and b are given by a=2.61313 $E_b/2N_o$ and b=1.08239 $E_b/2N_o$ For binary phase shift keying (2-DPSK) symbol and bit decision is accomplished by the simple detection of the sign of Re $\{z_n^{(1)}\}$. The theoretical bit error probability for 2-DPSK is $$P_b^{(2)} = \tfrac{1}{2}\exp(-E_b/N_o). \tag{16}$$

The decision rule in accordance with Equation (14) and the associated theoretical bit error rates in accordance with Equations (15) and (16) correspond to detection by means of a matched filter. This method is optimal in respect to the signal form, but does not take differential coding of the transmission signal into account.

OBJECT OF THE INVENTION

It is therefore an object of the invention to provide a method for bit detection of differentially coded phase shift keying (PSK) signal in which the gain in signal-to-noise ratio at the receiving end can be increased to a considerable extent with negligible additional expense and the bit error rate (BER) can be simultaneously considerably reduced, even with differential coding of the transmission signal.

In accordance with the invention this has essentially been attained by decision-controlled feedback as well as with the aid of L (L>1) symbol detectors of orders 1,2, ... L, where by the additional (L−1) symbol detectors with delays of 2,3, ... L symbol periods as well as by the already mentioned feedback, additional information is provided, which is used for symbol and bit regeneration. In this connection the order of each symbol detector corresponds to the delay in multiples of the symbol period in the differential-coherent demodulation.

In a realization of the invention, only a slight expansion of digital signal processing is required in a receiver with digital phase shift keying (DPSK) with a programmable signal processor. In this case the gain of signal-to-noise ratio at a bit error rate (BER) of BER=$10^{-5}$ and with the provision of three symbol detectors (i.e. L=3) is 1.3 dB for four-phase shift keying (4-DPSK) and 0.5 dB for two-phase shift keying (2-DPSK). For this reason the method in accordance with the invention should be mainly of interest in connection with four-phase shift keying (4-DPSK) because of the greater gain.

BRIEF DESCRIPTION OF THE DRAWINGS

The invention will be described below in detail by means of a preferred embodiment.

DESCRIPTION OF THE PREFERRED EMBODIMENT

Figure 1:
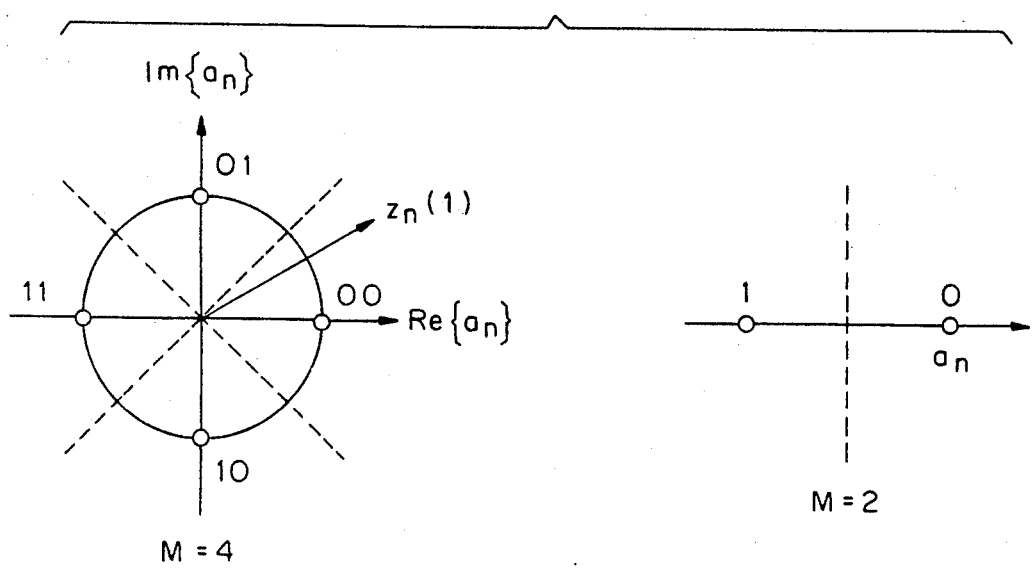
FIG. 1 is a schematic view of four-phase and two-phase shift keying signals $a_n$ in the complex plane.
Figure 2:
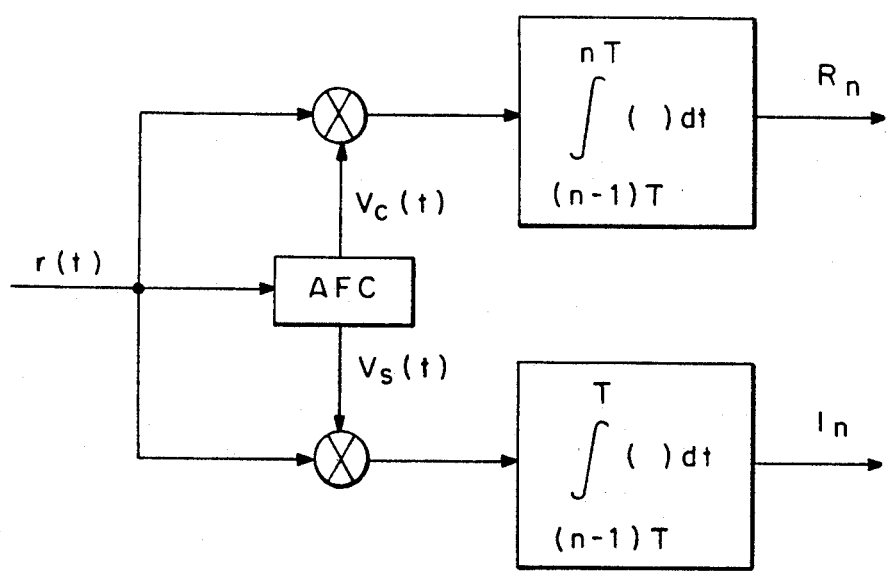
FIG. 2 is a block diagram of the generation of time-discrete, complex phase shift keying (PSK) base band signals in a receiver.

As already explained above in connection with FIG. 2, a time-discrete base band signal $y_n$ in the complex base band is composed of a real part $R_n$ and an imaginary part $I_n$, i.e. the result is the base band signal $y_n = R_n + jI_n$, already cited in Equation (7), which was created by mixing an input signal with reference signals, as already indicated in detail in Equations (8) and (9). Integration over a symbol period is subsequently performed; the output values derived by the integration are converted analog-digitally and are further digitally processed with a sampling rate of 1/T in the receiver. The above steps after integration are not specially shown in detail in the block diagram of FIG. 2.

Figure 3:
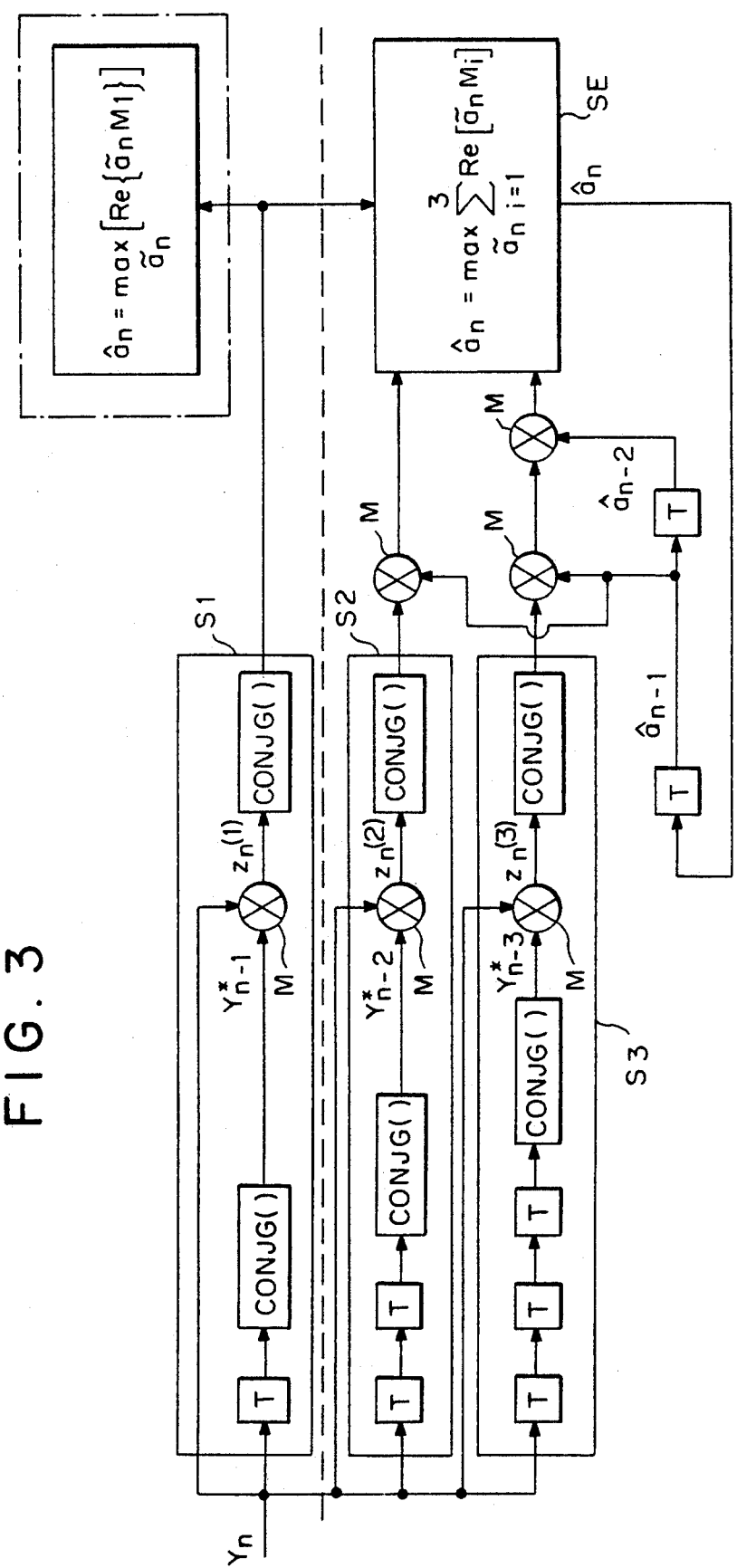
FIG. 3 is a circuit for the detection ($\hat{a}_n$) of a phase shift keying (PSK) symbol $a_n$ in the form of a block diagram with the aid of the method of the invention with a total of three (L=3) first, second and third order symbol detectors, in which a symbol decision ($\hat{a}'_n$), which has been performed by a conventional method, is indicated by means of a block framed in dash-dotted lines.

In FIG. 3 an extension of a conventional DPSK detector is shown below the dashed line drawn in the upper third, and a bit detection in accordance with the invention is shown in the exemplary embodiment with 3(L=3) symbol detectors S1 to S3. In this case the individual symbol detectors S1 to S3 only differ by the number of time delay elements T in which the signal is delayed by one (1) symbol period each.

The signal at the output of the signal detector S1, i.e. a first order signal detector, the differential-coherently demodulated signal $z_n^{(1)}$ already shown in Equation (12), already has been delayed by one symbol period by a time delay element T.

The signal at the output of the signal detector S2, i.e. a second order signal detector, where the signal delayed by two (2) symbol periods is used as phase reference over two time delay elements T, then is:

$$z_n^{(2)} = y_n y_{n-2}^* = \epsilon a_n a_{n-1} + n_n^{(2)}, \tag{17}$$

where $n_n^{(2)}$ again describes the noise term. Accordingly, the following is the result for the symbol detector S3, i.e. a third order signal detector $$z_n^{(3)} = y_n y_{n-3}^* = \epsilon a_n a_{n-1} a_{n-2} + n_n^{(3)}, \tag{18}$$

and for an L order detector $$z_n^{(L)} = y_n y_{n-L}^* = \epsilon a_n a_{n-1} \ldots a_{n-L+1} + n_n^{(L)}. \tag{19}$$

The noise terms $n_n^{(1)}, n_n^{(2)}, \ldots n_n^{(L)}$ are non-Gaussian and correlated with each other.

A symbol decision $\hat{a}_n$ in accordance with the invention is made in that the already detected symbols $\hat{a}_{n-1}, \hat{a}_{n-2}, \ldots \hat{a}_{n-1+1}$ are fed back over a number of time delay elements T, corresponding to the order of the respective symbol detector S2 to SL, together with succeeding multiplication elements. That symbol $a_n$ is determined, for which the sum of the squared distances $$|z_n^{(j)} - \epsilon a_n \hat{a}_{n-1} \hat{a}_{n-2} \ldots \hat{a}_{n-j+1}|^2, j=2,3 \ldots L$$

of the L symbol detectors is a minimum. Minimizing of these distances indicates in a graphic manner that a search is made for that phase shift keying (PSK-) symbol $a_n$, for which the sum of the squared "errors" at the output of the L symbol detectors is a minimum.

Thus, the decision rule for the symbol $a_n$ for the L symbol detectors of the orders $j=1, 2, \ldots L$ is $$a_n = \min_{a_n}\{|z_n^{(1)} - \epsilon a_n|^2 + |z_n^{(2)} - \epsilon a_n a_{n-1}|^2 + \ldots + |z_n^{(L)} - \epsilon a_n a_{n-1} a_{n-L+1}|^2\} \quad (20)$$

or $$a_n = \max_{a_n}\{Re[a_n z_n^{(1)*}] + Re[a_n a_{n-1} z_n^{(2)*}] + \ldots + Re[a_n a_{n-1} \ldots a_{n-L+1} z_n^{(L)*}]\} \quad (21)$$

Equation (21) may also be written in the form $$a_n = \max_{a_n} \sum_{j=1}^{L} Re\{a_n M_j\}$$

with $$M_j = \begin{cases} z_n^{(1)*}, & j=1 \\ a_{n-1} a_{n-2} \ldots a_{n-j+1} z_n^{(j)*}, & j=2,3,\ldots,L. \end{cases}$$

The conventional detector in accordance with Equation (14) thus constitutes for $L=1$ a special case of the method of the invention. Therefore the decision rule for a circuit arrangement of a detector in accordance with FIG. 3 with 3 ($L=3$) symbol detectors is $$a_n = \max_{a_n} \sum_{j=1}^{3} Re\{a_n M_j\} \quad (22)$$

$$= \max_{a_n}\{Re[a_n z_n^{(1)*}] + Re[a_n a_{n-1} z_n^{(2)*}] + Re[a_n a_{n-1} a_{n-2} z_n^{(3)*}]\}.$$

The improvements which can be attained with the aid of the method of the invention were determined by a Monte Carlo computer simulation. For checking the simulation, the results obtained by the simulation were simultaneously compared with exact analytical calculations. Perfect frequency and symbol clock synchronization was assumed for the simulation as well as for the theoretical investigation.

Figure 4:
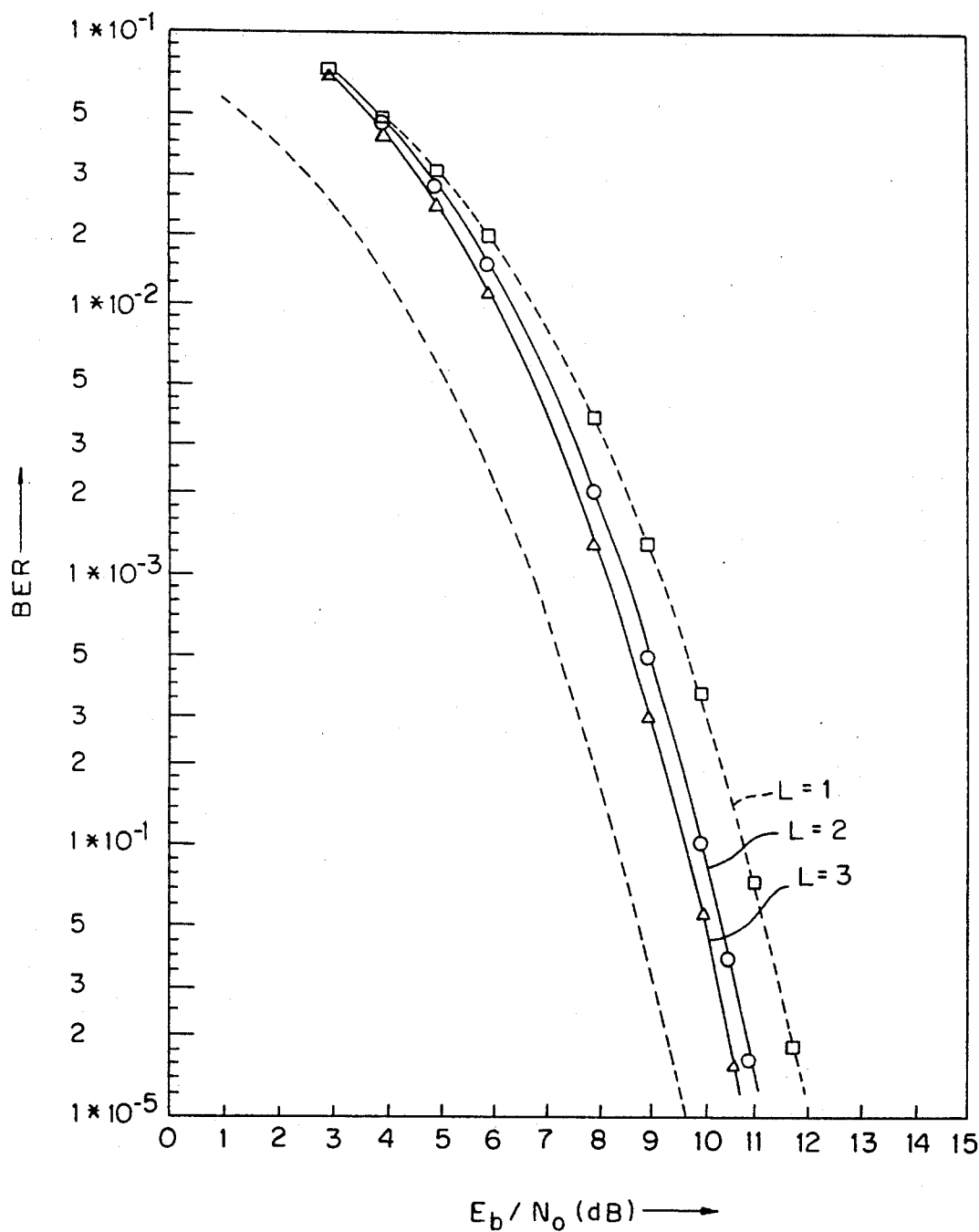
FIG. 4 is a graph, in which the bit error rate (BER) is shown on the ordinate and the bit energy/noise power density ratio ($E_b/N_o$) on the abscissa in connection with coherent four-phase shift keying (4-PSK) modulation according to the conventional method and according to the method of the invention.
Figure 5:
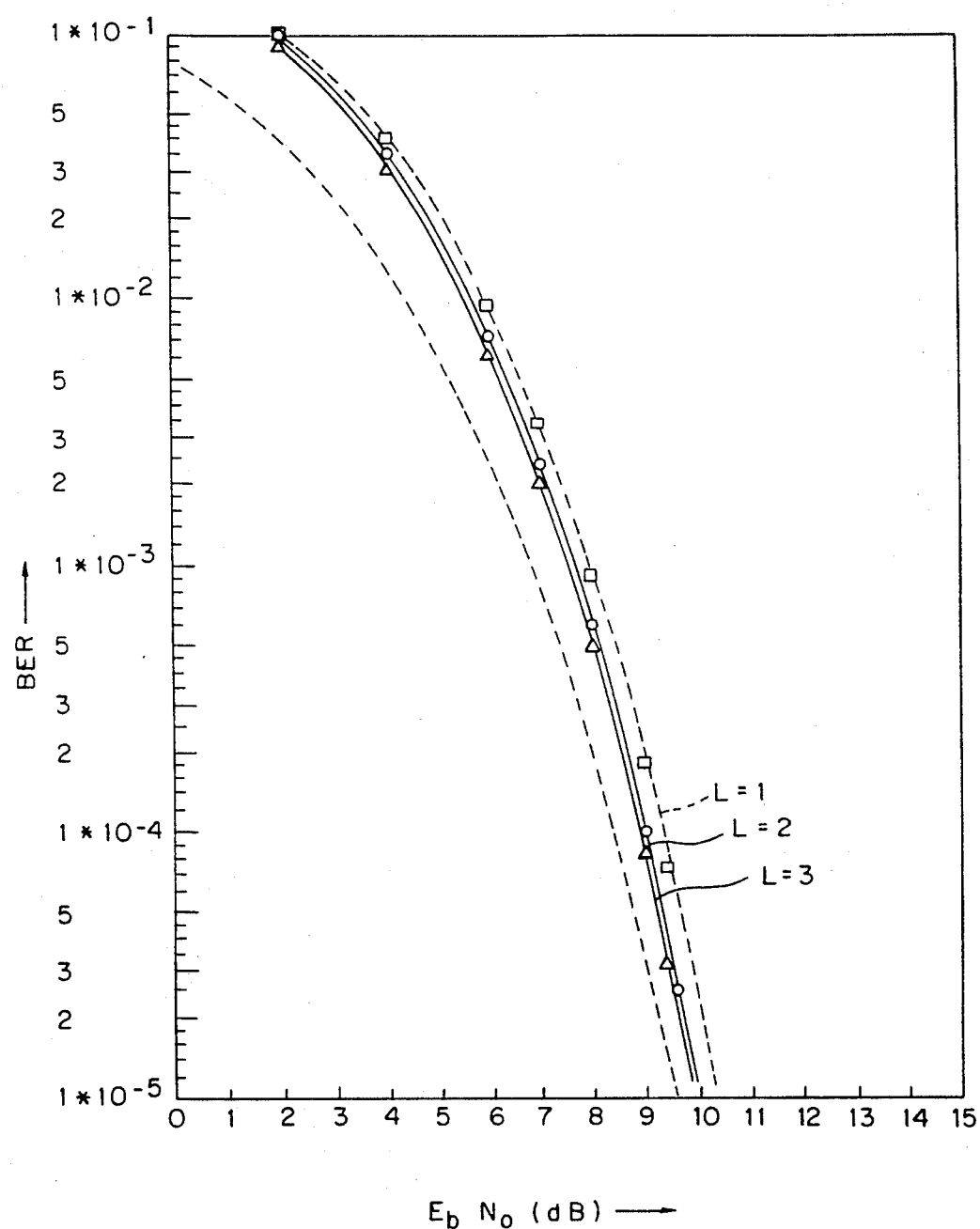
FIG. 5 is a graph corresponding to FIG. 4 on which the bit error rate with two-phase shift keying (2-DPSK) modulation in accordance with a conventional method and in accordance with the method of the invention is shown.

The results for four-phase shift keying (4-DPSK) and for two-phase shift keying (2-DPSK) are shown in detail in FIGS. 4 and 5. In this connection the curve disposed the farthest to the left and indicated by dashed lines corresponds to coherent four-phase shift keying (4-DPSK), while the curve disposed the farthest to the right and also indicated by dashed lines, corresponds to the conventional method using one ($L=1$) signal detector. The graph further shows that, if 3 ($L=3$) symbol detectors are provided for four-phase shift keying (4-DPSK), and at a bit error rate BER $= 10^{-5}$, a signal-to-noise ratio gain of approximately 1.3 dB is generated. As can be seen in FIG. 5, the corresponding gain for differential two-phase shift keying (2-DPSK) is 0.5 dB. Thus, with differential two-phase shift keying (2-DPSK) in accordance with the invention only approximately 0.3 dB more signal energy is required than is needed with the optimal coherent 2-PSK modulation. In practice probably no more than three symbol detectors would be generally used, because the additional possible improvement is small and phase constancy often no longer can be assured over a larger number of symbol periods.

FIG. 3 simply is a basic view of the invention; however, the block diagram of FIG. 3 can easily be simplified further. For example, the symbol decision $\hat{a}_n$ is not affected, i.e. remains unchanged, if all CONJG elements in FIG. 3 are removed and if the base band input signal $y_n$ is replaced in the first multiplication units M by its conjugate complex value $y_n^*$.

The inventor was able to derive analytically the following, theoretically interesting result for four- and two-phase shift keying respectively. For the bit detection in accordance with the method of the invention, the bit error rate of coherent 4-PSK or 2-PSK modulation is attained with an infinite number of symbol detectors (i.e. $L \to \infty$) and with error-free feedback.

It is possible to realize a bit detection in accordance with the method of the invention in a simple manner in a conventional DPSK receiver. In this case the time-discrete, complex base band reception signal $y_n$ can be obtained with the aid of analog circuits in the same manner as in a conventional DPSK receiver, as briefly described above by means of FIG. 2. In place of integrating units, however, it is also possible to utilize low-pass filters with which the double carrier frequency component is filtered out. Processing of the samples $y_n$ then takes place digitally, as shown in FIG. 3, with the aid of a special digital circuit or can also take place by means of a digital, programmable signal processor.

Because of its ruggedness, DPSK modulation with differential-coherent demodulation is a proven modulation method for fading channels and thus usable for mobile radios, for example. Because of its fast acquisition and simple circuit technology, DPSK is often used in satellite TDMA (time division multiple access) systems and in regenerating, i.e. demodulating satellite transponders.

The method of the invention is of particular importance for transmitting systems in which limitations of the signal power are of importance. This is the case to a particularly high degree in connection with satellite systems. The gain achievable with the method of the invention of 1.3 dB in four-phase shift keying (4-DPSK) with three symbol detectors and a bit error rate BER $= 10^{-5}$ means that with the same transponder transmission power the number of satellite channels can be increased by one third ($\frac{1}{3}$) (FDMA), or that the surface of a parabolic mirror of a transmitter ground station can be reduced by one third ($\frac{1}{3}$) which, in turn, results in considerable cost savings.

I claim:

1. A method for bit detection at the receiver end of differentially coded binary or quaternary phase shift keying signals in differential-coherent demodulation, wherein
   a received, processed signal ($y_n$) is supplied parallel to each of a number of L symbol detectors (S1 to SL) of the order j ($j=1,2,3,\ldots,L$; ($L>1$));
   said each of said number of L symbol detectors delaying said received, processed signal ($y_n$) by a respective j symbol period and outputting therein a conjugate complex signal ($y_{n-1}^*, y_{n-2}^*, \ldots y_{n-L}^*$);

each said conjugate complex signal and a further said received processed signal ($y_n$) inputted into a first multiplication element (M) of said each of said number of L symbol detectors and multiplied to a non-quantized output value $z_n^{(j)}$;

said non-quantized output value being subsequently complex conjugated in said each of said number of L symbol detectors;

said complex conjugated non-quantized output value of said each of said number of L symbol detectors inputted into a bit detection unit;

said bit detection unit outputting detected phase shift keying symbols ($\hat{a}_{n-1}, \hat{a}_{n-2}, \ldots \hat{a}_{n-L+1}$), which are subsequently delayed by time delay elements (T) and then fed back to said bit detection unit;

wherein a symbol ($a_n$) is determined for which the sum of the squared distances of said number of L symbol detectors assumes a minimum.

* * * * *